(12) United States Patent
Lee

(10) Patent No.: US 12,441,198 B2
(45) Date of Patent: Oct. 14, 2025

(54) BRAKING SYSTEM FOR VEHICLE AND CONTROL METHOD THEREOF

(71) Applicant: HL MANDO CORPORATION, Gyeonggi-do (KR)

(72) Inventor: Eunha Lee, Seoul (KR)

(73) Assignee: HL MANDO CORPORATION, Gyeonggi-do (KR)

(*) Notice: Subject to any disclaimer, the term of this patent is extended or adjusted under 35 U.S.C. 154(b) by 187 days.

(21) Appl. No.: 18/119,819

(22) Filed: Mar. 9, 2023

(65) Prior Publication Data

US 2023/0286391 A1  Sep. 14, 2023

(30) Foreign Application Priority Data

Mar. 10, 2022  (KR) .................. 10-2022-0030150

(51) Int. Cl.
*B60L 7/26* (2006.01)
*B60L 15/20* (2006.01)

(52) U.S. Cl.
CPC ............ *B60L 7/26* (2013.01); *B60L 15/2009* (2013.01); *B60L 2250/26* (2013.01)

(58) Field of Classification Search
CPC .......... B60L 15/2009; B60L 2240/465; B60L 2250/26; B60L 3/102; B60L 7/26
See application file for complete search history.

(56) References Cited

U.S. PATENT DOCUMENTS

| | | | | |
|---|---|---|---|---|
| 4,671,577 A | * | 6/1987 | Woods | B60T 13/662 180/197 |
| 5,399,000 A | * | 3/1995 | Aoki | B60L 7/26 303/3 |
| 5,433,512 A | * | 7/1995 | Aoki | B60T 8/267 303/3 |
| 5,632,534 A | * | 5/1997 | Knechtges | B60T 13/74 303/3 |
| 6,070,953 A | * | 6/2000 | Miyago | B60L 7/26 701/72 |
| 6,086,166 A | * | 7/2000 | Fukasawa | B60T 8/17636 303/122.04 |

(Continued)

FOREIGN PATENT DOCUMENTS

| | | |
|---|---|---|
| JP | 11-78839 | 3/1999 |
| KR | 10-2017-0024856 | 3/2017 |
| KR | 10-2019-0076358 | 7/2019 |

OTHER PUBLICATIONS

Office Action (1st) dated Jun. 25, 2025 for Korean Patent Application No. 10-2022-0030150 and its English translation provided by Applicant's foreign counsel.

*Primary Examiner* — Carl C Staubach

(74) *Attorney, Agent, or Firm* — WOMBLE BOND DICKINSON (US) LLP

(57) ABSTRACT

Disclosed herein is a braking system including a hydraulic braking device configured to supply a hydraulic pressure to front and rear wheels of a vehicle to perform braking of the vehicle and a controller configured to control the hydraulic braking device to compensate for a coast regeneration torque reduction amount, which is applied to a driving motor driving the rear wheels, using a hydraulic braking amount based on a slip rate of the rear wheel being greater than or equal to a preset threshold value during a regenerative braking by the driving motor.

19 Claims, 4 Drawing Sheets

(56) References Cited

U.S. PATENT DOCUMENTS

| | | | | |
|---|---|---|---|---|
| 6,231,134 | B1* | 5/2001 | Fukasawa | B60T 13/586 |
| | | | | 303/3 |
| 6,910,747 | B2* | 6/2005 | Tsunehara | B60T 8/267 |
| | | | | 303/3 |
| 7,651,177 | B2* | 1/2010 | Jeon | B60L 3/10 |
| | | | | 303/151 |
| 9,493,075 | B2* | 11/2016 | Crombez | B60T 1/10 |
| 11,325,573 | B2* | 5/2022 | Jeon | B60L 7/26 |
| 11,634,138 | B2* | 4/2023 | Hashimoto | B60L 3/108 |
| | | | | 701/22 |
| 11,820,374 | B2* | 11/2023 | Kim | B60T 1/10 |
| 12,090,892 | B2* | 9/2024 | Jeon | B60L 50/16 |
| 12,151,592 | B2* | 11/2024 | Jeon | B60T 13/686 |
| 2002/0167221 | A1* | 11/2002 | Kosik | B60W 20/13 |
| | | | | 903/947 |
| 2007/0018499 | A1* | 1/2007 | Kokubo | B60L 7/14 |
| | | | | 303/151 |
| 2013/0134767 | A1* | 5/2013 | Hakiai | B60W 10/08 |
| | | | | 303/3 |
| 2013/0173127 | A1* | 7/2013 | Nakatsu | B60L 7/14 |
| | | | | 701/70 |
| 2017/0057361 | A1* | 3/2017 | Cho | B60W 10/08 |
| 2018/0093571 | A1* | 4/2018 | Hall | B60L 7/08 |
| 2019/0105990 | A1* | 4/2019 | Cho | B60L 7/18 |
| 2019/0193568 | A1* | 6/2019 | Cho | B60T 8/17616 |
| 2023/0339443 | A1* | 10/2023 | Kwon | B60T 13/686 |

* cited by examiner

BRAKING SYSTEM FOR VEHICLE AND CONTROL METHOD THEREOF

CROSS-REFERENCE TO RELATED APPLICATION

This application claims the benefit of Korean Patent Application No. 10-2022-0030150, filed on Mar. 10, 2022 in the Korean Intellectual Property Office, the disclosure of which is incorporated herein by reference.

BACKGROUND

1. Field

Embodiments of the present disclosure relate to a braking system provided on a vehicle performing regenerative braking with a driving motor during braking of the vehicle and a control method thereof.

2. Description of the Related Art

In general, vehicles driven by driving motors, such as hybrid vehicles or electric vehicles, perform regenerative braking with the driving motor during braking in order to improve fuel efficiency.

A braking system may convert kinetic energy of the vehicle into electrical energy during braking of the vehicle, store the electrical energy in a battery, and use the electrical energy stored in the battery as kinetic energy of the vehicle when the vehicle is traveling, thereby improving fuel efficiency.

During regenerative braking, the braking system may perform regenerative braking cooperative control of controlling the sum of a regenerative braking amount generated by the driving motor and a hydraulic braking amount generated by a hydraulic braking device to satisfy a driver's required braking amount which is required by a driver.

In the case of a vehicle with a rear wheel motor with a large capacity, an amount of regenerative braking that can be performed by a rear wheel is very large. Compared to a vehicle which performs front-wheel regenerative braking, when regenerative braking is performed by a rear wheel, stability of the vehicle easily deteriorates on a slippery road surface due to over-braking of the rear wheel. In this circumstance, in order to maintain or restore the stability of the vehicle, a function of controlling slip occurring at the rear wheel is activated. In this case, since a coast regeneration torque of the driving motor is reduced, the driver may feel unintended deceleration of the vehicle. During coasting in which a vehicle is traveling by inertia, the vehicle operates the driving motor as a generator to recover inertial energy, and accordingly, has a characteristic that braking of the vehicle also occurs. The coast regeneration torque is a coasting torque (a torque in a direction opposite to the traveling direction) according to a vehicle speed during coasting. By setting the coast regeneration torque in the driving motor, inertial energy can be recovered as generated power, and in this case, braking also occurs.

SUMMARY

Therefore, it is an aspect of the present disclosure to provide a braking system and a control method thereof, which are capable of improving stability of a vehicle and a deceleration feeling of a driver by consistently maintaining deceleration of a vehicle even when wheel slip occurs during regenerative braking.

Additional aspects of the present disclosure will be set forth in part in the description which follows and, in part, will be obvious from the description, or may be learned by practice of the disclosure.

In accordance with one aspect of the present disclosure, a braking system, includes a hydraulic braking device configured to supply a hydraulic pressure to front and rear wheels of a vehicle to perform braking of the vehicle; and a controller configured to control the hydraulic braking device to compensate for a coast regeneration torque reduction amount, which is applied to a driving motor driving the rear wheels, using a hydraulic braking amount based on a slip rate of the rear wheel being greater than or equal to a preset threshold value during a regenerative braking by the driving motor.

The controller may generate a driver's required braking amount using the hydraulic braking amount instead of the regenerative braking amount generated during the regenerative braking based on the slip rate of the rear wheel being greater than the preset threshold value, determine a hydraulic braking compensation amount according to the coast regeneration torque reduction amount, and control the hydraulic braking device to additionally generate the hydraulic braking compensation amount.

The controller may determine a hydraulic braking compensation amount from a coast regeneration torque reduction amount and hydraulic braking compensation amount map stored in a memory.

The controller may receive the coast regeneration torque reduction amount from a vehicle controller provided in a vehicle to control the driving motor to perform the regenerative braking.

The controller is configured to determine a driver's required braking amount from brake pedal displacement information detected by a pedal displacement sensor, determine a maximum available amount of regenerative braking, which is able to be generated by the driving motor, based on a speed of the vehicle, and determine an allowable amount of regenerative braking based on a driver's required braking amount and the maximum available amount of regenerative braking.

The controller is configured to transmit the allowable amount of regenerative braking to a vehicle control unit as to generate a regenerative braking torque corresponding to the allowable amount of regenerative braking.

The controller is configured to receive an execution amount of regenerative braking of the driving motor from the vehicle control unit, determine a hydraulic braking amount from the driver's required braking amount and the execution amount of regenerative braking, and control the hydraulic braking device based on the hydraulic braking amount.

The controller is configured to receive the coast regeneration torque reduction amount of the driving motor from the vehicle control unit.

The controller is configured to deactivate the regenerative braking based on a slip rate of the rear wheel being greater than or equal to a preset first threshold value.

The controller is configured to receive the coast regeneration torque reduction amount of the driving motor from the vehicle control unit based on a slip rate of the rear wheel being greater than or equal to a preset second threshold value, and determine a hydraulic braking compensation amount based on the coast regeneration torque reduction amount.

In accordance with another aspect of the present disclosure, a method of controlling a braking system including a hydraulic braking device configured to supply a hydraulic pressure to front and rear wheels of a vehicle to perform braking of the vehicle, includes determining whether a slip rate of the rear wheel is greater than or equal to a preset threshold value during a regenerative braking by a driving motor driving the rear wheels, and controlling the hydraulic braking device to compensate for a coast regeneration torque reduction amount, which is applied to the driving motor, using a hydraulic braking amount based on a slip rate of the rear wheel being greater than the preset threshold value.

The compensating for the coast regeneration torque reduction amount using the hydraulic braking amount may include, generating a driver's required braking amount using the hydraulic braking amount instead of the regenerative braking amount generated during the regenerative braking based on the slip rate of the rear wheel being greater than or equal to the preset threshold value; determining a hydraulic braking compensation amount according to the coast regeneration torque reduction amount; and controlling the hydraulic braking device to additionally generate the hydraulic braking compensation amount.

The compensating for the coast regeneration torque reduction amount using the hydraulic braking amount may include receiving the coast regeneration torque reduction amount from a vehicle controller provided in the vehicle to control the driving motor to perform the regenerative braking.

The method may include determining a driver's required braking amount from brake pedal displacement information detected by a pedal displacement sensor, determining a maximum available amount of regenerative braking, which is able to be generated by the driving motor, based on a speed of the vehicle, and determining an allowable amount of regenerative braking based on a driver's required braking amount and the maximum available amount of regenerative braking.

The method may include transmitting the allowable amount of regenerative braking to a vehicle control unit as to generate a regenerative braking torque corresponding to the allowable amount of regenerative braking.

The method may include receiving an execution amount of regenerative braking of the driving motor from the vehicle control unit, determining a hydraulic braking amount from the driver's required braking amount and the execution amount of regenerative braking, and controlling the hydraulic braking device based on the hydraulic braking amount.

The method may include receiving the coast regeneration torque reduction amount of the driving motor from the vehicle control unit.

The compensating for a coast regeneration torque reduction amount using the hydraulic braking amount may include deactivating the regenerative braking based on a slip rate of the rear wheel being greater than or equal to a preset first threshold value.

The compensating for a coast regeneration torque reduction amount using the hydraulic braking amount further may include receiving the coast regeneration torque reduction amount of the driving motor from the vehicle control unit based on a slip rate of the rear wheel being greater than or equal to a preset second threshold value, and determining a hydraulic braking compensation amount based on the coast regeneration torque reduction amount.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
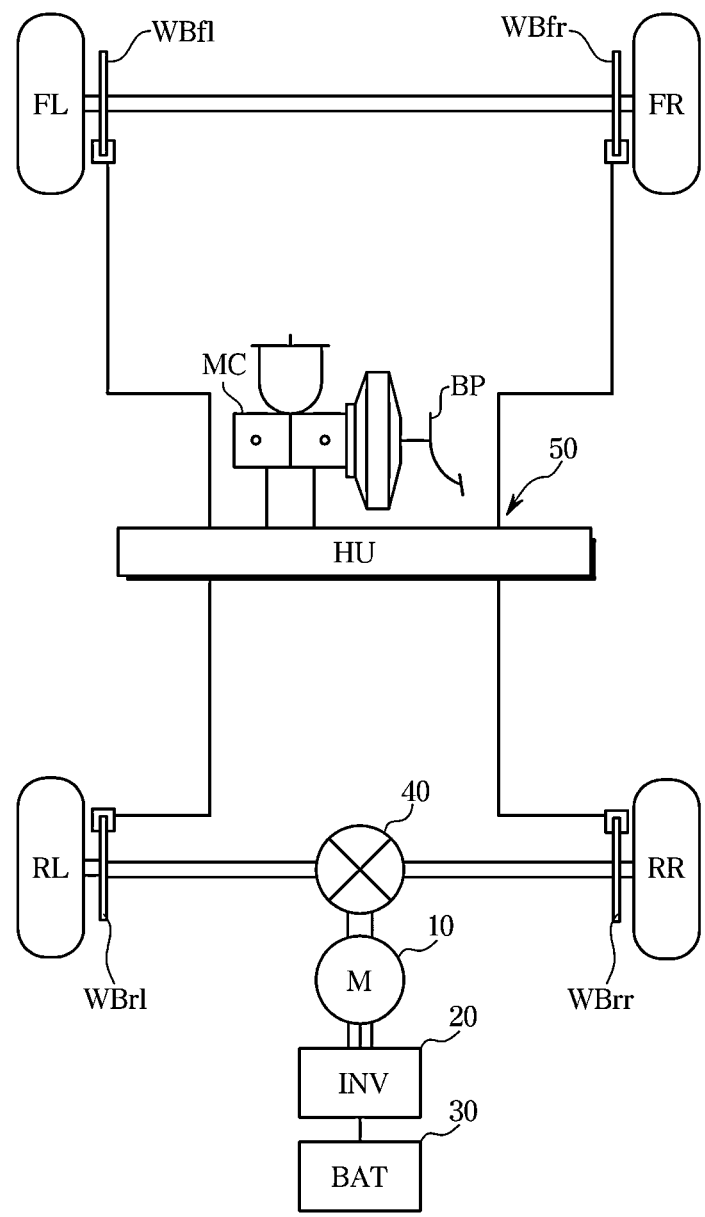
FIG. 1 is a diagram illustrating a vehicle according to an embodiment.

The same reference numeral refers to the same component throughout the present specification. The present specification does not describe all components of embodiments, with common descriptions in the technical field to which the present disclosure pertains and overlapping descriptions between the embodiments being omitted. The terms "part," "module," "member," or "block" used herein may be implemented in software or hardware, and according to embodiments, a plurality of "parts," "modules," "members," or "blocks" can be implemented in a single component or a single "part," "module," "member," or "block" can include a plurality of components.

Throughout the present specification, when a part is referred to as being "connected" to another part, it includes not only a direct connection but also an indirect connection, and the indirect connection includes a connection through a wireless communication network.

Further, when a part is referred to as "including" a component, this means that the part can include other elements, rather than excluding any other components unless specifically stated otherwise.

Throughout the present specification, when a member is referred to as being "on" another member, this includes not only when the member is in contact with another member, but also when still another member is present between the member and the other member.

The terms "first," "second," and the like are used to distinguish one component from another component, but the components are not limited by these terms. The singular forms include plural forms unless the context clearly notes otherwise.

In each operation, a reference numeral is used for convenience of description, but this reference numeral does not describe the order of the operations, and the operations may be performed differently from the described order unless clearly specified in the context.

FIG. 1 is a diagram illustrating a vehicle according to an embodiment.

Referring to FIG. 1, a vehicle in which a braking system is installed is an electric vehicle having two front wheels FL and FR and two rear wheels RL and RR, and the two rear wheels RL and RR serve as driving wheels.

The vehicle travels by rotating the left and right rear wheels RL and RR, which are driving wheels, through a driving motor 10 which is a driving source.

The driving motor 10 is driven by an inverter 20.

A battery 30 is electrically connected to the inverter 20. The inverter 20 is operated with power supplied from the battery 30 to drive the driving motor 10.

The driving motor 10 generates a rotational driving force with the inverter 20. The rotational driving force output from the driving motor 10 is distributed by a differential device 40 and transmitted to the left and right rear wheels RL and RR, which are driving wheels. Thus, the left and right rear wheels RL and RR are rotationally driven, and the vehicle may travel.

The driving motor 10 may operate as a generator in a regenerative braking mode due to braking, deceleration, or low-speed traveling to charge the battery.

The driving motor 10, the inverter 20, and the battery 30 constitute a regenerative braking device for generating a regenerative braking force at the left and right rear wheels RL and RR.

In addition, the vehicle includes a hydraulic braking device 50 for generating a hydraulic braking force at the front and rear wheels with a brake hydraulic pressure. The hydraulic braking device 50 may include wheel brakes WBfl, WBfr, WBrl, and WBrr for hydraulic braking of the wheels FL, FR, RL, and RR, and a hydraulic unit HU for supplying hydraulic pressures to the wheel brakes WBfl, WBfr, WBrl, and WBrr to provide hydraulic braking forces to the wheels FL, RR, RL, and FR.

The hydraulic braking device 50 may include a master cylinder MC connected to a brake pedal BP manipulated by a driver, and a hydraulic unit HU for supplying a hydraulic pressure of the master cylinder MC to the wheel brakes WBfl, WBrr, WBrl, and WBfr, for supplying a hydraulic pressure pressurized by a motor pump and a hydraulic pressure of a high-pressure accumulator to the wheel brakes WBfl, WBrr, WBrl, and WBfr, or for supplying a hydraulic pressure generated by moving a hydraulic piston in a pressure chamber using a rotating force of a motor to the wheel brakes WBfl, WBrr, WBrl, and WBfr. The hydraulic unit HU may be a brake actuator in which a plurality of components are integrated.

Meanwhile, a vehicle in which the braking system is installed may be a hybrid electric vehicle (HEV) with an internal combustion engine.

Figure 2:
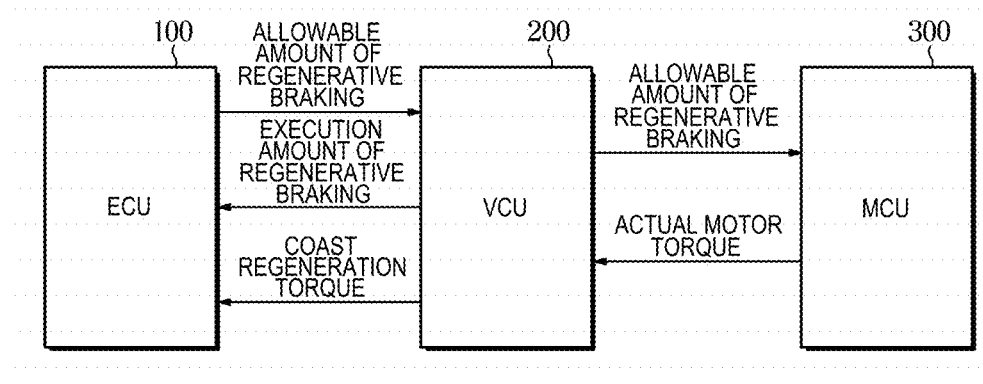
FIG. 2 is a diagram illustrating a control block of the braking system according to an embodiment.

FIG. 2 is a diagram illustrating a control block of the braking system according to one embodiment.

Referring to FIG. 2, the braking system may include a control unit (ECU) 100 which is a brake controller, a vehicle control unit (VCU) 200, and a motor control unit (MCU) 300.

The VCU 200 may be a high-level controller for controlling overall operation of the vehicle.

The VCU 200 may transmit and receive information to and from the ECU 100 and the MCU 300 through controller area network (CAN) communication and perform cooperative control. In addition to the ECU 100 and the MCU 300, the VCU 200 may collect battery state information to use the battery state information for battery charging/discharging control or transmit and receive information to and from a low-level controller (battery management system (BMS)) providing the information to other controllers through CAN communication.

The VCU 200 may receive and collect various pieces of information from the ECU 100 and the MCU 300 and transmit control commands to the ECU 100 and the MCU 300, which are low-level controllers.

In addition to the CAN communication, the VCU 200 may be interconnected to other controllers based on various communication techniques including, for example, Ethernet, media oriented systems transport (MOST), Flexray, and a local interconnect network (LIN).

The MCU 300 may control the driving and regeneration of the driving motor through the inverter 20 according to a control command from the VCU 200.

The ECU 100 may control an operation of the hydraulic unit HU of the hydraulic braking device 50.

Figure 3:
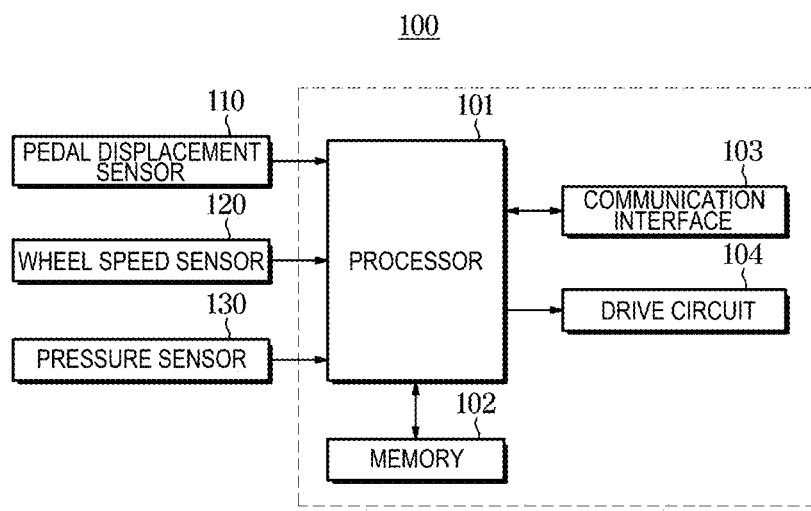
FIG. 3 is a diagram illustrating a control block of a controller of the braking system according to an embodiment.

FIG. 3 is a diagram illustrating a control block of a controller of the braking system according to one embodiment.

Referring to FIG. 3, a pedal displacement sensor 110, a wheel speed sensor 120, and a pressure sensor 130 may be electrically connected to the ECU 100.

The ECU 100 may include a processor 101, a memory 102, a communication interface 103, and a drive circuit 104.

The processor 101 may perform overall control of the ECU 100.

The memory 102 may temporarily store data received from the pedal displacement sensor 110, the wheel speed sensor 120, and the pressure sensor 130 and data received through the communication interface 103 and may temporarily store a data processing result of the processor 101.

The memory 102 may include volatile memories such as a static random access memory (SRAM) and a dynamic RAM (DRAM) as well as non-volatile memories such as a flash memory, a read only memory (ROM) and an erasable and programmable ROM (EPROM).

The communication interface 103 may perform communication with the VCU 200. The processor 101 may transmit information to the VCU 200 through the communication interface 103 and receive a variety of information including accelerator pedal operation information from the VCU 200.

The drive circuit 104 may drive various components including valves or/and motors of the hydraulic unit HU according to a control signal from the processor 101.

The pedal displacement sensor 110 may detect an operation and/or displacement of the brake pedal BP.

The wheel speed sensor 120 may detect a wheel speed of each of the wheels FL, FR, RL, and RR.

The pressure sensor 130 may detect a pressure of the hydraulic braking device 50. The pressure sensor 130 may detect a pressure of the master cylinder MC and a pressure of at least one among the wheel brakes WBfl, WBrr, WBrl, and WBfr and the hydraulic unit HU.

The processor 101 may generate a hydraulic braking force by operating the hydraulic unit HU using brake pedal displacement information, wheel speed information, and pressure information.

The processor 101 may determine a driver's required braking amount from the brake pedal displacement information detected by the pedal displacement sensor 110.

The processor 101 may determine an allowable amount of regenerative braking which is an amount of regenerative braking that can be generated by regenerative braking of the driving motor 10. The allowable amount of regenerative braking may be a guide for how much regenerative braking can be generated by performing regenerative braking by the driving motor 10 within the driver's required braking amount. The allowable amount of regenerative braking may be determined in consideration of specifications of the driving motor 10.

The processor 101 may determine a minimum value among the driver's required braking amount and a maximum available amount of regenerative braking which can be generated by the regenerative braking of the driving motor 10 to be an allowable amount of regenerative braking. The maximum available amount of regenerative braking may be determined from a maximum available amount of regenerative braking map based on a vehicle speed.

The processor 101 may determine the maximum available amount of regenerative braking using the vehicle speed determined from the wheel speed detected through the wheel speed sensor 120.

Referring to FIG. 2 again, the ECU 100 may transmit information on the allowable amount of regenerative braking to the VCU 200.

When the allowable amount of regenerative braking is received from the ECU 100, the VCU 200 may transmit the received allowable amount of regenerative braking to the MCU 300.

When the allowable amount of regenerative braking is received from the VCU 200, the MCU 300 may control the driving motor 10 to generate a regenerative braking torque corresponding to the received allowable amount of regenerative braking according to a motor torque command. Therefore, regenerative braking may be performed by the driving motor 10.

The MCU 300 may transmit actual motor torque information of the driving motor 10 to the VCU 200.

When an actual motor torque is received from the MCU 300, the VCU 200 may determine an execution amount of regenerative braking according to the received actual motor torque. The VCU 200 may determine a control amount corresponding to the motor torque as the execution amount of regenerative braking.

The VCU 200 may transmit information on the execution amount of regenerative braking to the ECU 100.

When the execution amount of regenerative braking is received from the VCU 200, the ECU 100 may determine a hydraulic braking amount from the driver's required braking amount and the execution amount of regenerative braking.

The ECU 100 may control the hydraulic unit HU to instruct each of the wheel brakes WBfl, WBrr, WBrl, and WBfr to generate a hydraulic braking torque corresponding to the determined hydraulic braking amount.

The VCU 200 may transmit the coast regeneration torque information to the ECU 100.

The ECU 100 may recognize a control situation of the coast regeneration torque performed by the VCU 200 based on the coast regeneration torque received from the VCU 200.

The ECU 100 may compensate for the coast regeneration torque, which is deactivated for the purpose of maintaining deceleration of the vehicle, using a hydraulic pressure and consistently maintain the total braking force of the vehicle, thereby improving a deceleration feeling of the driver.

As described above, compared to a case in which the regenerative braking is performed using front wheels, when the regenerative braking is performed using rear wheels in a hybrid or electric vehicle driven by a rear wheel motor, stability of the vehicle is easily degraded on a slippery road due to over-braking of the rear wheels. In a case in which a driving motor with a large motor capacity is installed at the rear wheel, since the regenerative braking is very large, the stability of the vehicle is more easily degraded. In this situation, wheel slip occurring on the rear wheel is controlled to maintain or restore the stability of the vehicle. At this time, since the wheel slip may increase due to the coast regeneration torque, the coast regeneration torque is reduced. However, since the driver may unintentionally feel a decrease in deceleration of the vehicle due to a decrease of the regeneration torque, the driver may feel an impact and discomfort due to a deceleration change.

In the present embodiment, by compensating for the decrease of the coast regeneration torque with a hydraulic braking amount to consistently maintain the deceleration of the vehicle, the stability of the vehicle and the deceleration of the driver can be improved.

Figure 4:
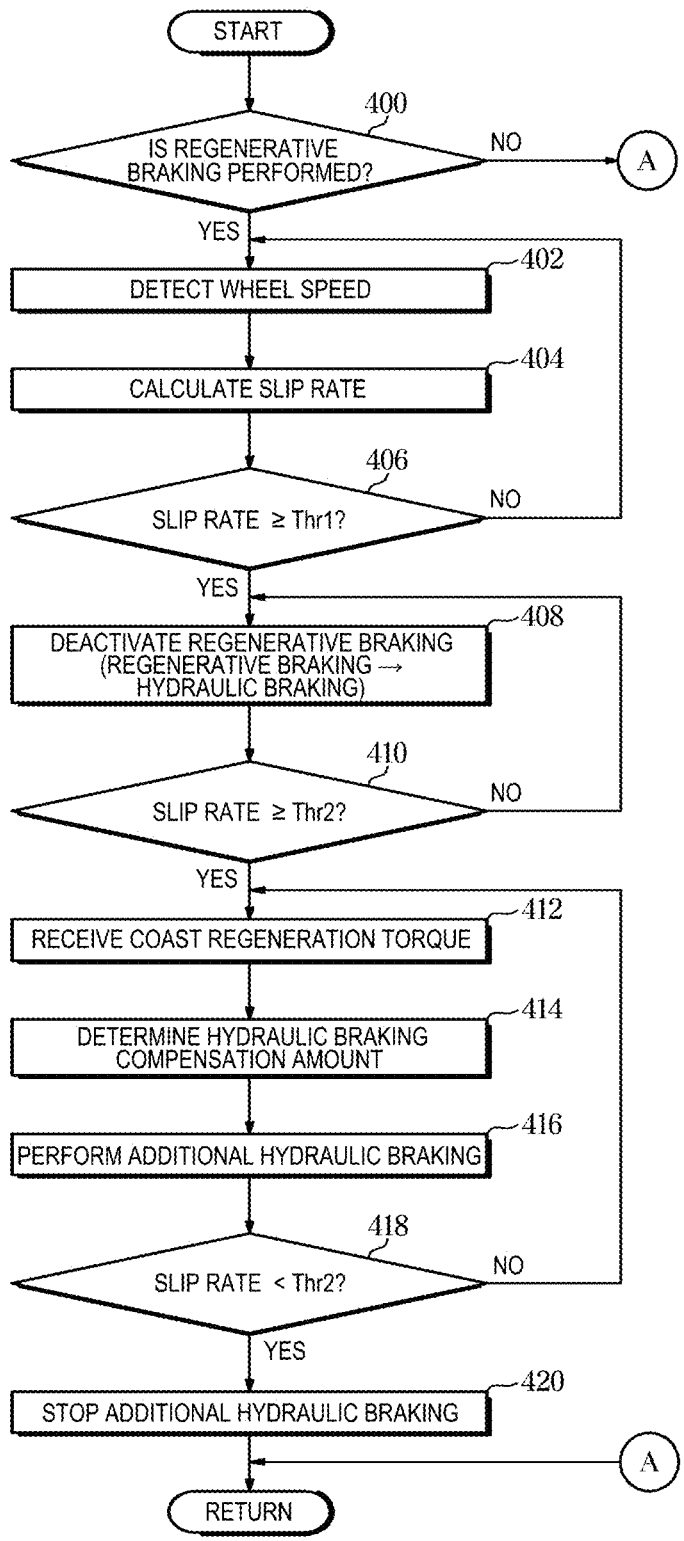
FIG. 4 is a flowchart illustrating a method of controlling a braking system according to an embodiment.

FIG. 4 is a flowchart illustrating a method of controlling a braking system according to an embodiment.

Referring to FIG. 4, the ECU 100 determines whether regenerative braking is performed (400).

When the regenerative braking is performed, the ECU 100 detects a wheel speed first (402) and calculates a slip rate S (404) in order to determine whether wheel slip occurs during the regenerative braking.

Each wheel speed Vw is detected through the wheel speed sensor 120, and a vehicle body speed V is calculated according to the detected wheel speeds.

The slip rate S may be calculated from the wheel speed Vw and the vehicle body speed V as in the following equation 1.

$$S=(V-Vw)/V \qquad \text{[Equation 1]}$$

In addition to being calculated based on the wheel speed Vw, the vehicle body speed V may be calculated using an acceleration sensor or the like.

The slip rate S can be obtained by dividing the difference between the wheel speed Vw and the vehicle body speed V by the vehicle body speed V.

The ECU 100 compares the slip rate S with a preset first threshold value Thr1 and determines whether the slip rate S is greater than or equal to the preset first threshold value Thr1 (406). The preset first threshold Thr1 may be a threshold for deactivating the regenerative braking and switching the regenerative braking to hydraulic braking. When the slip rate S is greater than or equal to the preset first threshold value Thr1, since there is a concern that the braking force from the regenerative braking may not be able to satisfy the driver's required braking amount, it may be determined that it is necessary to switch the regenerative braking to the hydraulic braking.

When the slip rate S is greater than or equal to the preset first threshold value Thr1, the ECU 100 deactivates the regenerative braking (408). In this case, hydraulic braking is increased in proportion to the deactivation of the regenerative braking.

The ECU 100 compares the slip rate S with a preset second threshold value Thr2 (Thr2>Thr1) and determines whether the slip rate S is greater than or equal to the preset second threshold value Thr2 (410).

When the slip rate S is greater than or equal to the preset second threshold value Thr2, the ECU 100 receives a coast regeneration torque reduction amount from the VCU 200 (412) and determines a hydraulic braking compensation amount according to the coast regeneration torque reduction amount (414). When the slip rate S is greater than or equal to the preset second threshold value Thr2, the VCU 200 performs reduction control for reducing the coast regeneration torque. In this case, the control unit 100 may receive the coast regeneration torque reduction amount from the VCU 200 and determine a hydraulic braking compensation amount corresponding to the coast regeneration torque reduction amount in order to compensate for the coast regeneration torque reduction amount in the total braking torque. A hydraulic braking compensation amount corresponding to the coast regeneration torque reduction amount may be set in advance. The control unit 100 may determine the hydraulic braking compensation amount from the coast regeneration torque reduction amount and the hydraulic braking compensation amount map stored in the memory 102.

The ECU 100 performs additional hydraulic braking (416). The control unit 100 performs control for additionally generating hydraulic braking as much as the determined hydraulic braking compensation amount, thereby generating a hydraulic braking amount obtained by adding the hydraulic braking compensation amount to a hydraulic braking amount corresponding to the driver's required braking amount. Even when the hydraulic braking amount is additionally increased as much as the coast regeneration torque reduction amount, the braking force provided only to the rear wheels may be equally distributed to the front and rear wheels so that stability of the vehicle can be improved and the deceleration can be consistently maintained.

When the slip rate S is less than the preset first threshold value Thr2 (418), the ECU 100 stops the regenerative braking (420). As described above, the ECU 100 may perform the additional hydraulic braking during a section in which the coast regeneration torque is reduced to consistently maintain the total braking torque, thereby improving the stability of the vehicle and improving a deceleration feeling of the driver.

Figure 5:
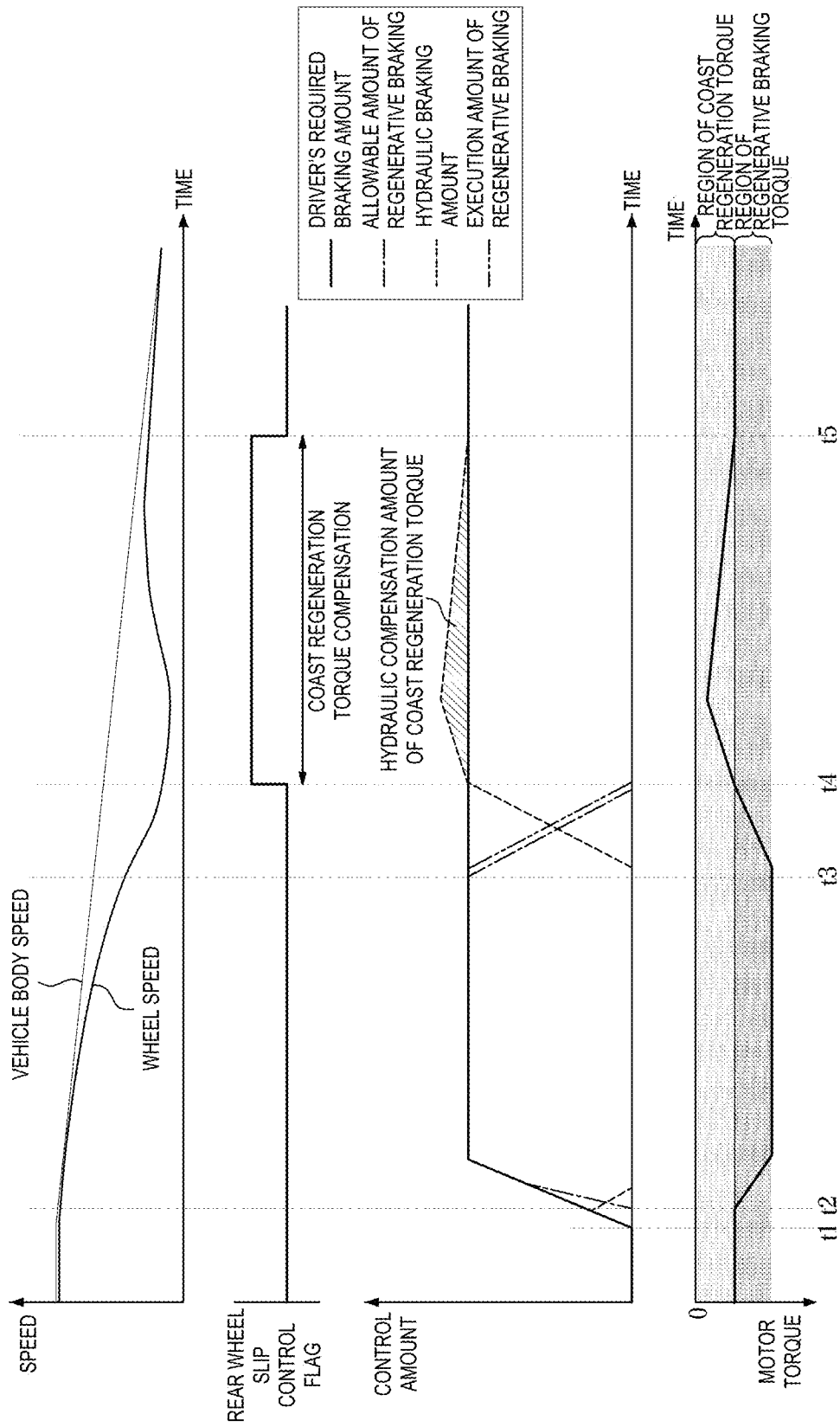
FIG. 5 is a timing diagram illustrating regenerative cooperative braking control in the braking system according to an embodiment.

FIG. 5 is a timing diagram illustrating regenerative cooperative braking control in the braking system according to an embodiment.

Referring to FIG. 5, the ECU 100 consistently maintains the total braking force by compensating for the coast regeneration torque, which is reduced while a slip control flag of the rear wheel is set, with the hydraulic braking. The slip control flag of the rear wheel is determined according to a wheel slip rate of the rear wheel.

More specifically, when the vehicle is coasting (0 to t1), the VCU 200 starts to supply a coast regeneration torque to the driving motor 10 through the MCU 300. The coast regeneration torque is a negative torque applied in a direction opposite to a driving direction of the vehicle in a state in which both opening degree amounts of each the acceleration pedal and the brake pedal are "0" (coasting), and the coast regeneration torque is a torque for which the driving motor 10 operates as a generator to recover inertial energy as power. Generally, the coast regeneration torque is set according to the vehicle speed.

When a manipulation of the brake pedal is detected at a time point t1, the ECU 100 determines the driver's required braking amount from the brake pedal displacement information detected by the pedal displacement sensor 110.

Since there is no regenerative braking execution amount at the time point t1, the ECU 100 may drive the hydraulic unit HU until a time point t2 at which the regenerative braking execution amount starts to occur and generate a hydraulic braking amount corresponding to the driver's required braking amount. After the time point t2, the regenerative braking execution amount is increased as much as a ratio by which the hydraulic braking amount is reduced.

In this state, when the driver steps on the brake pedal BP less and thus the driver's required braking amount is low, the entirety of the driver's required braking amount may be generated through the regenerative braking. On the other hand, when the driver steps on the brake pedal BP more and thus the driver's required braking amount is high, a regenerative braking amount may be generated through the regenerative braking, and a hydraulic braking amount may be generated through the hydraulic braking. A period between time points t2 and t3 of FIG. 5 represents a process of generating the entirety of the driver's required braking amount through the regenerative braking.

At the time point t2, the ECU 100 may transmit an allowable amount of regenerative braking to the VCU 200. The VCU 200 may transmit the allowable amount of regenerative braking to the MCU 300. The ECU 300 actually receives the allowable amount of regenerative braking and controls the driving motor 10 to perform the regenerative braking according to a motor torque command depending on the allowable amount of regenerative braking. The allowable amount of regenerative braking is a guide for how much regenerative braking the driving motor 10 is to perform within the driver's required braking amount, and the allowable amount of regenerative braking may be a minimum value among the driver's required braking amount and a maximum available amount of regenerative braking which can be generated by the regenerative braking of the driving motor 10.

From the time point t2 to the time point t3, the control unit 100 converges the allowable amount of regenerative braking on the driver's required braking amount. The period between the time points t2 and t3 is a period in which, as the allowable amount of regenerative braking is sent, the regenerative braking execution amount is gradually increased, and the entirety of the driver's required braking amount is generated as the regenerative braking execution amount.

When the slip rate of the rear wheel increases to the preset first threshold value Thr1 or more while the regenerative braking is performed, the ECU 100 switches the regenerative braking to the hydraulic braking in a period between time points t3 and t4 to deactivate the regenerative braking. By increasing the hydraulic braking amount as much as the regenerative braking amount is reduced, the regenerative braking is switched to the hydraulic braking.

When the slip rate S is greater than or equal to the preset second threshold value Thr2 which is set to be greater than the preset first threshold value Thr1, the ECU 100 sets a rear wheel slip control flag.

During the period between time points t4 and t5 in which the rear wheel slip control flag is set, the VCU 200 gradually reduces the coast regeneration torque as the vehicle body speed decreases. In order to consistently maintain the total braking torque, the ECU 100 additionally supplies a hydraulic braking compensation amount as much as the reduced coast regeneration torque to consistently maintain the total braking torque. Even when the hydraulic braking amount is increased as much as the coast regeneration torque reduction amount, the braking force provided only to the rear wheels may be equally distributed to four wheels so that stability of the vehicle can be improved and the deceleration can be consistently maintained.

Meanwhile, the above-described controller and/or components thereof may include one or more processor(s)/microprocessor(s) combined with a computer-readable recording medium storing computer-readable codes/algorithms/software. The one or more processor(s)/microprocessor(s) may execute the computer-readable codes/algorithms/software stored in the computer-readable recording medium to perform the above-described functions, operations, and steps.

The above-described controller and/or the components thereof may further include a memory implemented as a computer-readable non-transitory recording medium or a computer-readable temporary recording medium. The memory may be controlled by the above-described controller and/or the components thereof and may be configured to store data transmitted to or received from the above-described controller and/or the components thereof or to store data that has been or will be processed by the above-described controller and/or the components thereof.

The disclosed embodiments may also be implemented as computer-readable codes/algorithms/software on a computer-readable recording medium. The computer-readable recording medium may be a computer-readable non-transitory recording medium such as a data storage device capable of storing data which can be read by a processor/microprocessor. Examples of the computer-readable recording medium include a hard disk drive (HDD), a solid state drive (SSD), a silicon disk drive (SDD), a ROM, a compact disc (CD) ROM (CD-ROM), a magnetic tape, a floppy disk, and an optical data storage device.

As is apparent from the above description, even when wheel slip occurs during regenerative braking, deceleration of a vehicle is consistently maintained so that stability of the vehicle and a deceleration feeling of a driver can be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A braking system comprising:
a hydraulic braking device configured to supply a hydraulic pressure to front and rear wheels of a vehicle to perform braking of the vehicle; and
a controller configured to determine a hydraulic braking compensation amount corresponding to a coast regeneration torque reduction amount caused by performing reduction control for reducing the coast regeneration torque and control the hydraulic braking device to generate the determined hydraulic braking compensation amount corresponding to the coast regeneration torque reduction amount in addition to the coast regeneration torque when a slip rate of the rear wheel is greater than or equal to a preset threshold value during a regenerative braking by a driving motor, wherein the coast regeneration torque reduction amount is applied to the driving motor driving the rear wheels.

2. The braking system of claim 1, wherein the controller is configured to:
generate a driver's required braking amount using a hydraulic braking amount instead of the regenerative braking amount generated during the regenerative braking based on the slip rate of the rear wheel being greater than the preset threshold value.

3. The braking system of claim 1, wherein the controller is configured to determine the hydraulic braking compensation amount from a coast regeneration torque reduction amount and hydraulic braking compensation amount map stored in a memory.

4. The braking system of claim 1, wherein the controller is configured to receive the coast regeneration torque reduction amount from the vehicle controller provided in the vehicle to control the driving motor to perform the regenerative braking.

5. The braking system of claim 1, wherein the controller is configured to:

determine a driver's required braking amount from brake pedal displacement information detected by a pedal displacement sensor,
determine a maximum available amount of regenerative braking, which is able to be generated by the driving motor, based on a speed of the vehicle, and
determine an allowable amount of regenerative braking based on a driver's required braking amount and the maximum available amount of regenerative braking.

6. The braking system of claim 5, wherein the controller is configured to transmit the allowable amount of regenerative braking to a vehicle control unit as to generate a regenerative braking torque corresponding to the allowable amount of regenerative braking.

7. The braking system of claim 6, wherein the controller is configured to:
receive an execution amount of regenerative braking of the driving motor from the vehicle control unit,
determine a hydraulic braking amount from the driver's required braking amount and the execution amount of regenerative braking, and
control the hydraulic braking device based on the hydraulic braking amount.

8. The braking system of claim 7, wherein the controller is configured to receive the coast regeneration torque reduction amount of the driving motor from the vehicle control unit.

9. The braking system of claim 1, wherein the controller is configured to deactivate the regenerative braking based on the slip rate of the rear wheel being greater than or equal to another preset threshold value.

10. The braking system of claim 9, wherein the controller is configured to:
receive the coast regeneration torque reduction amount of the driving motor from a vehicle control unit based on the slip rate of the rear wheel being greater than or equal to the another preset threshold value, and
determine the hydraulic braking compensation amount based on the coast regeneration torque reduction amount.

11. A method of controlling a braking system including a hydraulic braking device configured to supply a hydraulic pressure to front and rear wheels of a vehicle to perform braking of the vehicle, the method comprising:
determining whether a slip rate of the rear wheel is greater than or equal to a preset threshold value during a regenerative braking by a driving motor driving the rear wheels; and
determining a hydraulic braking compensation amount corresponding to a coast regeneration torque reduction amount caused by performing reduction control for reducing the coast regeneration torque and controlling the hydraulic braking device to generate the determined hydraulic braking compensation amount corresponding to the coast regeneration torque reduction amount in addition to the coast regeneration torque when the slip rate of the rear wheel is greater than or equal to the preset threshold value, wherein the coast regeneration torque reduction amount is applied to the driving motor driving the rear wheels.

12. The method of claim 11, wherein the compensating for the coast regeneration torque reduction amount using the hydraulic braking amount comprises:
generating a driver's required braking amount using a hydraulic braking amount instead of the regenerative braking amount generated during the regenerative braking based on the slip rate of the rear wheel being greater than or equal to the preset threshold value.

13. The method of claim 11, wherein the compensating for the coast regeneration torque reduction amount using the hydraulic braking amount comprises receiving the coast regeneration torque reduction amount from the vehicle controller provided in the vehicle to control the driving motor to perform the regenerative braking.

14. The method of claim 11, further comprising:
determining a driver's required braking amount from brake pedal displacement information detected by a pedal displacement sensor,
determining a maximum available amount of regenerative braking, which is able to be generated by the driving motor, based on a speed of the vehicle, and
determining an allowable amount of regenerative braking based on a driver's required braking amount and the maximum available amount of regenerative braking.

15. The method of claim 14, further comprising transmitting the allowable amount of regenerative braking to a vehicle control unit as to generate a regenerative braking torque corresponding to the allowable amount of regenerative braking.

16. The method of claim 15, further comprising:
receiving an execution amount of regenerative braking of the driving motor from the vehicle control unit,
determining a hydraulic braking amount from the driver's required braking amount and the execution amount of regenerative braking, and
controlling the hydraulic braking device based on the hydraulic braking amount.

17. The method of claim 16, further comprising receiving the coast regeneration torque reduction amount of the driving motor from the vehicle control unit.

18. The method of claim 11, wherein the compensating for a coast regeneration torque reduction amount using the hydraulic braking amount comprises deactivating the regenerative braking based on the slip rate of the rear wheel being greater than or equal to another preset threshold value.

19. The method of claim 18, wherein the compensating for a coast regeneration torque reduction amount using the hydraulic braking amount further comprises:
receiving the coast regeneration torque reduction amount of the driving motor from a vehicle control unit based on the slip rate of the rear wheel being greater than or equal to the another preset threshold value, and
determining the hydraulic braking compensation amount based on the coast regeneration torque reduction amount.

* * * * *